April 30, 1957  R. H. DYKEHOUSE  2,790,203
PRE-PLASTICIZING UNIT FOR USE WITH A PLASTIC MOLDING MACHINE
Filed Feb. 25, 1953  2 Sheets-Sheet 1
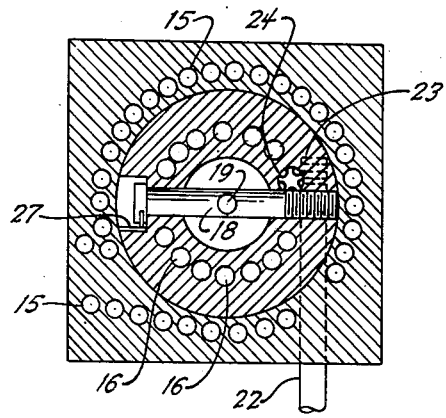
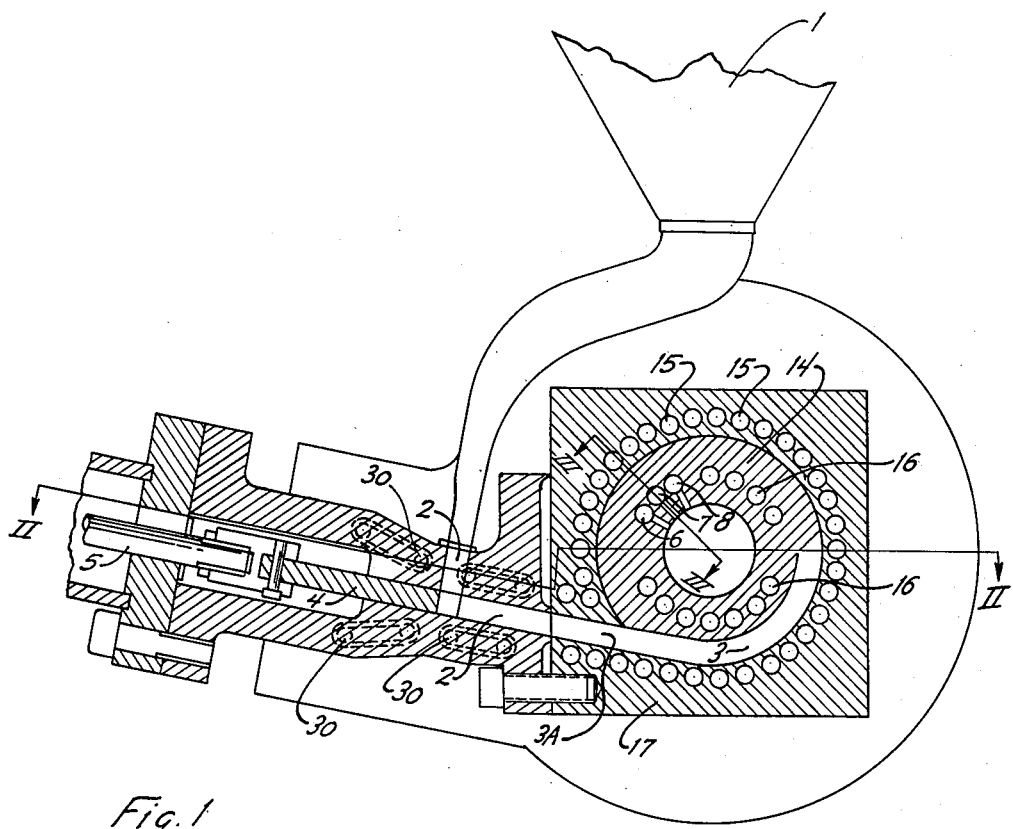
INVENTOR.
ROBERT H. DYKEHOUSE
BY April 30, 1957   R. H. DYKEHOUSE   2,790,203
PRE-PLASTICIZING UNIT FOR USE WITH A PLASTIC MOLDING MACHINE
Filed Feb. 25, 1953   2 Sheets-Sheet 2

INVENTOR.
ROBERT H. DYKEHOUSE
BY R. W. Hodgson

United States Patent Office 2,790,203
Patented Apr. 30, 1957

2,790,203

PRE-PLASTICIZING UNIT FOR USE WITH A PLASTIC MOLDING MACHINE

Robert H. Dykehouse, Monterey Park, Calif.

Application February 25, 1953, Serial No. 338,636

8 Claims. (Cl. 18—30)

Generally speaking, the present invention relates to the plastic molding art and, more particularly, to an improved pre-plasticizing unit, either in combination with an injection unit, or individually.

In that phase of the plastic molding art known as injection molding, it is customary to feed particulate plastic material into a heated injection chamber where it is forced, under extremely high pressures of the order of twenty thousand pounds per square inch or more, through a nozzle into the interior cavity of an injection mold, where the plastic hardens to form a desired molded object. This process has certain undesirable features in that the plastic material may not be evenly plasticized and/or heated throughout and, therefore, the finished molded object may be warped or otherwise imperfect in an extremely undesirable manner from the standpoint of consistent high-quality production. Furthermore, with such a system, rapid injection cycles are usually not possible—thus greatly reducing the total production in any given period of time.

Certain prior attempts to remedy the above-mentioned situation have been made. These have produced several so called pre-plasticizers which are intended to plasticize plastic material before feeding it into the injection chamber. These prior art pre-plasticizers have numerous disadvantages. For example, most of them are extremely large and cumbersome and will not effectively and rapidly transfer the required amount of heat to the contained plastic material to properly plasticize it—that is this plasticizing operation cannot be completed rapidly enough to allow high speed injection molding. One reason for this is the fact that most plastic materials are relatively poor conductors of heat. Therefore, when such plastic materials are positioned in a large mass in a heated prior art plasticizer, heat is not effectively transmitted to the center or interior portions of the mass of plastic material—even after a considerable time has elapsed. In an attempt to correct this, most operators of plastic molding machines have increased the heat applied to the exterior of the mass of plastic material in the hope of being able to effectively heat the interior of said mass of plastic material more rapidly. However, this does not produce the desired result—instead, it produces a very undesirable result because it causes the exterior portions of the mass of plastic material to be heated to excessively high temperatures, such as to be extremely detrimental to the quality of the objects molded therefrom.

The above-mentioned defects, which are equally true of prior art pre-plasticizers and prior art injection units, are further supplemented by the excessively high working pressures required, which are undesirable from a number of different standpoints. Also, because of the above-mentioned heat transfer problems of prior art constructions and the consequent high working pressures required, it is not even possible to design a specific injection unit and/or pre-plasticizer, of the prior art type, capable of handling a specified quality of plastic in a given period of time, because, as the required size of such a unit is doubled or tripled, the required amount of heat input to the system, the required amount of heat transfer surface area, and the required amount heat transfer time for a given quantity of plastic (the so-called "soak time") and the required pressure all increase in a non-linear and unpredictable manner such as to require said values to be of extremely high magnitudes. This limits the upper size and capacity and production rates of such prior art devices and, furthermore, makes it extremely difficult to design one to prescribed specifications. Usually such prior art machines are made on a purely empirical basis—in other words, by actually making and trying machines of different sizes and then modifying them so that they will operate, rather than by using the principles of engineering design.

Generally speaking, one basic form of the present invention includes the combination of a pre-plasticizing unit adaptable for use with a plastic molding machine, and an injection chamber having an injection ram movable therein and having a discharge passage adapted to be put into connection with a mold, although the pre-plasticizing unit is also claimed per se. The pre-plasticizing unit includes a reservoir adapted to hold a supply of plastic solids (usually in particulate form), feed passage means cooperable with the reservoir to receive plastic solids from said reservoir, a plasticizing passage having a large ratio of heat transfer surface area to volumetric capacity (preferably, though not necessarily, of extended ribbon-like form), and having an outflow end and inflow end cooperable with the feed passage to receive plastic solids therefrom. Also included is feed means (preferably, though not necessarily, spatulate feed ram means) for moving plastic solids along said plasticizing passage. Also included, in the combination form of the invention, is discharge passage means cooperable with the outflow end of the plasticizing passage and cooperable with the injection chamber to effectively connect said plasticizing passage and said injection chamber. Also included is heating means effectively cooperable with the pre-plasticizing unit in closely adjacent effective heat transfer relationship with respect to the plasticizing passage whereby to effectively plasticize plastic solids therein.

In one preferred general form of the present invention, the heating means is so cooperably positioned and arranged with respect to the plasticizing passage as to effectively transfer a substantially greater amount of heat to the plastic in the plasticizing passage adjacent the inflow end thereof than adjacent the outflow end thereof whereby to minimize required operating pressures within the plasticizing passage.

Also, in one preferred general combination form of the present invention, the plasticizing passage is effectively coiled around the injection chamber, and the heating means is also in effective transfer relationship with respect to the injection chamber.

Also in one preferred combination form of the invention, outflow valve means may be arranged to control the discharge passage from the injection chamber to the mold, and means for actuating said outflow valve and the injection ram (and, if desired, the feed means) in predetermined relationship may be employed.

From the above general description of the basic form and several preferred generic forms of the present invention, it will be apparent to those skilled in the art that virtually all of the hereinabove mentioned disadvantages of prior art structures and methods, are virtually entirely eliminated and overcome in and through the use of the present invention.

For example, the extremely high ratio of effective heat transfer area to volumetric capacity of the plasticizing passage of the present invention makes it possible to effectively heat and plasticize all of the plastic material moved through said passage and to do so without excessive heating of certain portions of the plastic to deleterious high temperatures in the above-mentioned undesirable prior art manner, and without requiring excessive working pressures in the undesirable prior art manner. This is facilitated by reason of the heat exchange principle employed—that of causing substantially greater heat transfer to the relatively cold plastic material at the inflow end of the plasticizing passage than to the much hotter plastic at the outflow end of the plasticizing passage. The combination of these two principles in the invention, makes it possible to use a low working pressure of the order of 4000 lbs. per square inch, or less, and to rapidly repeat the injection cycle at a rate very much higher than is capable of attainment by the above-mentioned prior art devices and systems.

Furthermore, because the present invention produces consistent plasticizing and does not produce excessive temperatures in any portions of the plastic, virtually perfect molded plastic objects are produced by the molding process without the above-mentioned prior art warping and deleterious effects occasioned by inconsistent plasticizing and temperature distribution throughout the plastic.

Furthermore, the device of the present invention is very much smaller and more compact than prior art systems intended for the same purpose. This is particularly true of the form of the invention wherein the plasticizing passage is effectively coiled around the injection chamber.

It should also be noted that this last mentioned form of the invention is particularly advantageous because the heating means is in effective heat transfer relationship with respect to both the plasticizing passage and the injection chamber—thus increasing the "soak time" and increasing the thermal efficiency of the entire unit.

With the above points in mind, it is an object of the present invention to provide a novel pre-plasticizer adapted for use with a plastic molding machine, and so constructed as to provide extremely effective and consistent heating and plasticizing of plastic material whereby to minimize required working pressure and to greatly increase the operating speed and production capacity of a plastic molding machine.

It is a further object of the present invention to provide a device of a character set forth in the preceding object wherein the plastic material to be plasticized is adapted to be forced through a heated extended ribbon-like plasticizing passage whereby to maximize the ration of heat transfer area of said passage to the volumetric capacity thereof.

It is a further object of the present invention to provide a device of the character set forth in either or both of the preceding objects wherein spatulate ram means is employed for effectively moving the plastic material through the pre-plasticizer.

It is a further object of the present invention to provide a device of the character set forth in any or all of the preceding objects wherein a plasticizing passage is arranged in effectively coiled relationship with respect to an injection chamber and whereby heating means is arranged in effective heat transfer relationship with respect to both.

It is a further object of the present invention to provide a device of the character set forth in any or all of the preceding objects wherein heating means associated with a plasticizing passage is arranged to effectively deliver a substantially greater quantity of heat to plastic material in the inflow end of the plasticizing passage than to plastic material in the outflow end of said plasticizing passage.

It is a further object of the present invention to provide a device of the character set forth in the preceding object including outflow valve means for effectively controlling discharge of plasticized material from the injection chamber into a mold, and including means for actuating said outflow valve means and an injection ram in timed relationship.

Other and allied objects will be apparent to those skilled in the art after a careful perusal, examination and study of the accompanying illustrations, the present specification, and the appended claims.

To facilitate understanding, reference will be made to the hereinbelow described drawings, in which:

Fig. 1 is a fragmentary vertical sectional view of one illustrative embodiment of the present invention taken in the direction of the arrows I—I in Fig. 2.

Fig. 4 is a fragmentary view, partly in vertical section, taken in the direction of the arrows IV—IV in Fig. 2.

Figure 2:
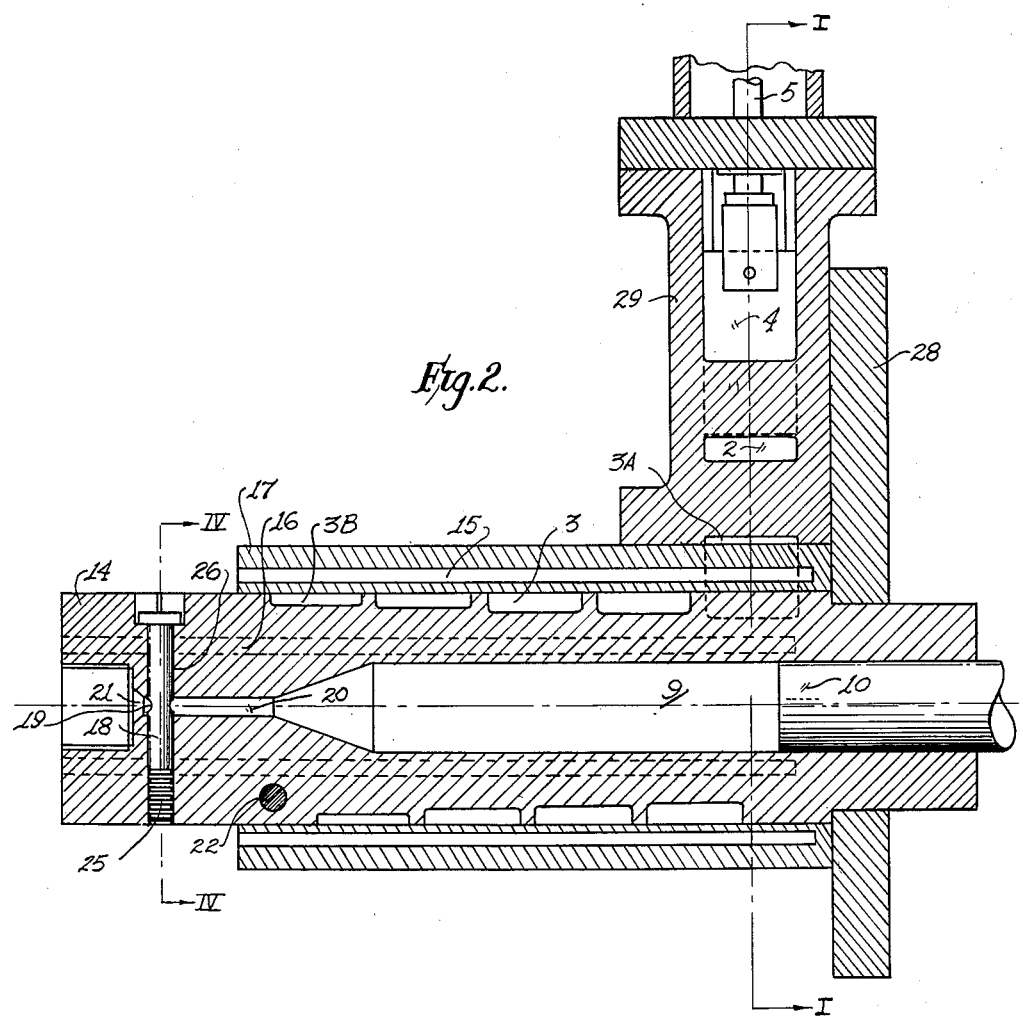
Fig. 2 is a horizontal sectional view taken in the direction of the arrows of II—II in Fig. 1.

Generally speaking, the present invention comprises a pre-plasticizing unit adaptable for use with a plastic molding machine. In the specfic example illustrated, the invention takes the form of a pre-plasticizing unit adaptable for use with a plastic molding machine, and an injection chamber having an injection ram movable therein and having a discharge passage adapted to be put into connection with a mold. In the form illustrated, the pre-plasticizing unit includes a reservoir, indicated generally at 1 and shown in fragmentary form in Fig. 1, adapted to hold a supply of particulate plastic solids (not shown). The device illustrated, also includes feed passage means, indicated at 2, cooperable with the reservoir 1 to receive plastic solids from said reservoir.

Also, generally speaking, the present invention includes an extended plasticizing passage having an outflow end and an inflow end cooperable with the feed passage means to receive plastic solids therefrom. Also, generally speaking, feed means is provided for moving plastic solids along said extended plasticizing passage. In the specific example illustrated, the extended plasticizing passage takes the form of a ribbon-like, effectively coiled, plasticizing passage 3 having an outflow end indicated at 3B and an inflow end indicated at 3A, with said inflow end 3A cooperable with said feed passage 2 to receive plastic solids therefrom. In the specific example illustrated, the feed means comprises a spatulate ram 4 provided with linkage means 5 adapted to reciprocate the spatulate ram means 4 in a predetermined manner from an external power source (not shown) whereby to feed particulate plastic solids into the inflow end 3A of the plasticizing passage 3.

The combination form of the invention illustrated, may include discharge passage means cooperable with the outflow end of the extended plasticizing passage and cooperable with an injection chamber to effectively connect the plasticizing passage and the injunction chamber. In the form of the invention illustrated, three such discharge passage means are indicated at 6, 7 and 8 and each effectively communicates the outflow end 3B of the plasticizing passage 3 and the hollow interior of an injection chamber, indicated generally at 9, whereby plasticized material can be fed into said injection chamber 9 immediately ahead of an injection ram 10 when in its rearward position prior to the injection stroke.

Figure 3:
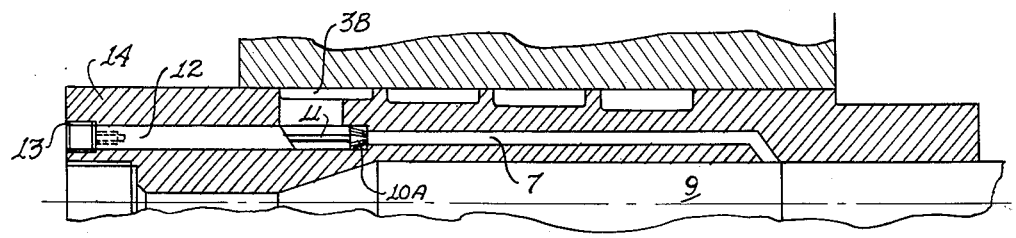
Fig. 3 is a fragmentary sectional view taken in the direction of the arrows III—III in Fig. 1.

The combination form of the invention illustrated, may also be provided with removable filter means effectively positionable in the discharge flowpath of plasticized material from the plasticizing passage to the injecton chamber. In the particular example illustrated, this takes the form of three such filters removably positioned so as to extend into each of the discharge passages 6, 7 and 8. One such filter means is illustrated in Fig. 3 at 10A and comprises the apertured filter portion 10A (which may be a multiple void type filter and/or magnetic trapping means) connected by rod 11 to a member 12 which is removable through the aperture 13 in the end of the cylindrical inner housing member 14 whereby particles of extraneous material which might normally interfere with the proper operation of the pre-plasticizer, injection molding chamber and/or plastic molding machine will be prevented from passing filter 10A, and whereby said particles can be removed entirely by merely removing the filter 10A and cleasing same prior to re-inserting it.

Also, generally speaking, heating means is effectively cooperably arranged in closely adjacent effective heat transfer relationship with respect to the extended plasticizing passage. In the particular combination example illustrated, the heating means is also arranged in effective heat transfer relationship with respect to the injection chamber. As illustrated, the heating means comprises electrically energizable longitudinal heating elements, indicated diagrammatically at 15 and 16—the elements 15 being exterior of the plasticizing passage 3 and the elements 16 being interior thereof whereby heat will be transferred to plastic material in the plasticizing passage 3 from virtually all surfaces of said plasticizing passage 3. As illustrated, the heating elements 15 and 16 respectively are concentrically axially arranged in the parallelopiped-shaped outer housing 17 and the cylindrical inner housing 14, respectively, in a manner whereby each of said elements may be removed from the left end of the entire assembly, as viewed in Fig. 2 if desired. These heating elements may be of any desired type, although a preferred form comprises what is known as "Cal-rod" heating elements. These are not shown in detail since such heating elements are well known in the art.

It should also be noted that in a preferred form, the heating elements 15 and 16 are so arranged as to deliver much larger quantities of heat adjacent the inflow end 3A of the plasticizing passage 3 than adjacent the outflow end 3B. This can be accomplished by having a selected portion of the heating elements 15 and/or 16 inoperative along certain portions of their lengths (such as the left ends of some of said units, as viewed in Fig. 2) whereby approximately 70%, or thereabouts, of the total heat produced will be delivered adjacent the inflow end 3A of the plasticizing passage 3 and the remainder of the heat produced will be delivered adjacent the outflow end 3B of the plasticizing passage 3. This tends to quickly melt the relatively cold solid plastic material received at the inflow end 3A whereby it can be effectively plasticized and moved along and through the plasticizing passage 3 with a minimum of working pressure applied thereto by the ram 4. As the plastic material progresses along the helically coiled plasticizing passage 3, it progressively becomes more plasticized and fluid and, therefore, the cross-sectional area of the plasticizing passage can be effectively reduced, as illustrated in Figs 2 and 3, so that the outflow end 3B is of considerably smaller cross-sectional area. This is not a limitation, however.

It should be noted that, preferably, the heating elements 15 and 16 are adapted to be thermostatically controlled so as to maintain the temperature of a selected region adjacent said heating elements within a predetermined range. This may be accomplished by positioning a thermostat in said selected region and placing it in controlling relationship with respect to the heating elements and a source of electrical energy.

In the combination form of the invention comprising a pre-plasticizing unit and an injection chamber, outflow valve means may be provided for controlling a discharge passage from the injection chamber to a mold, and means may be provided for actuating said outflow valve and an injection ram (and in certain cases a feed ram) in predetermined timed relationship. In the particular example illustrated, the outflow valve comprises a valve rod 18 reciprocably mounted in a bore 26 horizontally positioned across the left end of the cylindrical housing 14 (as viewed in Fig. 2). The rod 18 is provided with a lateral valve port 19 extending therethrough and normally communicating a nozzle extension 20 of the injection chamber 9 with a mold connection means 21 adapted to be placed in communication with an injection mold (not shown), whereby plasticized plastic material contained in injection chamber 9 may be forced by the injection ram 10 through the nozzle 20 and the valve port 19 and mold connection means 21 into an injection mold (not shown). The valve rod 18 and the lateral port 19 therein may be reciprocated in the bore 26 so as to effectively disconnect the nozzle 20 and mold connection means 21, by reciprocation of a rod 22 provided with a rack 23 in engagement with a splined shaft 24 which is in engagement with a rack 25 carried by the rod 18. The valve actuating rod 22 may be connected to a suitable power source, not shown (such as a hydraulic motor, for example), whereby the valve will be opened and closed in timed relationship with respect to the injection and retraction strokes of the injection ram 10 (which is also adapted to be connected to a suitable external source of power, not shown). The arrangement is usually such that the valve port 19 will effectively communicate the injection chamber 9 and an injection mold (not shown) just before the injection ram 10 begins its injection stroke and will effectively disconnect same just before the injection ram 10 begins its retraction stroke. Incidentally, the retraction stroke, with the valve closed, necessitates a small-aperture bleed bypass means 27 to allow the ram 10 to be withdrawn. It should also be noted that the spatulate feed ram 4 may also be timedly correlated with respect to the actuation of the valve port 19 and the injection ram 10, if desired. Or the feed ram 4 can merely feed up to a certain pressure, or other types of feeding control means may be employed.

It should be noted that the junctions of the exterior housing 17, the interior housing 14, the end plate 28 and the feed ram housing 29 may all be effectively sealed by welding or the like, if desired.

The operation of the device may be briefly described as follows: Particulate plastic material is placed in the feed reservoir 1, and thence fed through feed passage means 2 into the inflow end 3A of the plasticizing passage 3 under the controlled actuation of the spatulate feed ram 4 by linkage 5 connected to an external power source (not shown). In the feed passage area, the plastic material is maintained at relatively low temperatures, so as to avoid sticking, by water cooling tube means 30. The plastic material in the inflow portion 3A of the plasticizing passage 3A is quickly and thoroughly heated and plasticized. This is facilitated by the high ratio of heat transfer area to volumetric capacity of the plasticizing passage, and is further facilitated for reason of the fact that the heating elements 15 and 16 liberate in the inflow region the majority of the total heat produced. The plastic material is forced along the helically coiled plasticizing passage 3 until it reaches the outflow end 3B, from whence it passes through discharge passages 6, 7 and 8 and filters such as the filter 10A, into the injection chamber 9 immediately ahead of the ram 10. An external power source (not shown) then causes the valve actuating rod 22 to be retracted thus opening valve port 19, and then causes forward actuation of injection ram 10 so as to force a portion of the evenly heated thoroughly plasticized plastic material in the injection chamber 9 through the nozzle 20, the valve port 19, the mold connection means 21 into an injection mold (not shown). The external power source then effectively closes the valve port 19 and retracts the ram 10 into the position shown in Fig. 2, allowing the spatulate ram 4 to force additional plasticized material from the outflow end 3B of the plasticizing passage 3 through the filters (such as the filter 10A) and discharge passage 6, 7 and 8 into the injection chamber 9, to again fill said chamber 9 to capacity.

It should be noted that, in the combination form of the present invention, the heating means serves to deliver heat to both the plasticizing passage and the injection chamber, thus serving a dual purpose.

Numerous modifications and variations of the present invention will occur to those skilled in the art after a careful study hereof. All such properly within the basic spirit and inventive concept of the present invention are intended to be included and comprehended herein as fully as if specifically described, illustrated and claimed herein.

For example, it should be noted that the present invention is not limited to the combination of a pre-plasticizer and an injection chamber (including outflow valve means). The present invention includes the combination of a pre-plasticizer and an injection chamber without any limitations as to the outflow valve means. Also the physical structure of the injection chamber and the physical structure of the pre-plasticizer, and their physical relationship may be modified substantially within the spirit of the present invention. It should be noted that the present invention is not limited to such a combination, but that it is also directed to a pre-plasticizer per se.

It should be noted that the heating means may be modified substantially and need not necessarily comprise individual heating elements of the type described. Any suitable heating means may be employed. For example, conduit means employing a heating fluid, or the like, may be employed, or the heating may be by means of electromagnetic waves, or any other suitable means and/or method may be used.

The means for feeding plastic material to the plasticizing passage may be modified. The shape of the plasticizing passage and its physical configuration may also be modified substantially within the teaching hereof, as may the discharge passage and/or filter means (which, under some circumstances, may be eliminated).

The exact structures, compositions, configurations, relative positionings and cooperable relationships of the various component parts of the present invention are not critical, and can be modified substantially within the spirit of the present invention.

The embodiments of the present invention specifically described and illustrated herein are exemplary only, and are not intended to limit the scope of the present invention, which is to be interpreted in the light of the prior art and the appended claims only, with due consideration for the doctrine of the equivalents.

I claim:

1. A pre-plasticizing unit adaptable for use with a plastic molding machine having an injection chamber with an injection ram movable therein and having a discharge passage adapted to be put into connection with a mold, said pre-plasticizing unit including a reservoir adapted to hold a supply of particulate plastic solids, feed passage means cooperative with the reservoir to receive plastic solids from said reservoir, and extended plasticizing passage substantially rectangular in cross sectional area having an outflow end and an inflow end cooperable witht the feed passage to receive plastic solids therefrom, said passage being coiled about the length of the injection chamber and having its outflow end terminating in a passage leading to the injection chamber of the molding machine, means operatively mounted in said feed passage responsive to pressure in the plasticizing passage for moving plastic solids along said extended plasticizing passage, discharge passage means cooperative with the outflow end of the extended plasticizing passage and cooperable with said injection chamber to effectively connect said extended plasticizing passage and said injection chamber, heating means intermediate the plasticizing passage and injection chamber in closely adjacent effective heat transfer relationship with respect to the extended plasticizing passage therealong whereby to effectively plasticize plastic solids therein as they are moved by the said feed means from the inflow end of the extended plasticizing passage to the outflow end thereof and valve means for controlling the flow of plastic material from the injection chamber into the mold, said valve means being operable in timed relation with the injection ram.

2. A pre-plasticizing unit adaptable for use with a plastic molding machine including a reservoir adapted to hold a supply of particulate plastic solids, feed passage means cooperative with the reservoir to receive plastic solids from said reservoir, an extended plasticizing passage substantially rectangular in cross sectional area having an outflow end and an inflow end cooperable with the feed passage to receive plastic solids therefrom, said passage being spirally disposed about the injection chamber of the molding machine and extending the length thereof, means disposed in said feed passage responsive to pressure in the plasticizing passage for moving plastic solids along said extended plasticizing passage and depositing same in the said injection chamber, and heating means intermediate the plasticizing passage and the injection chamber in closely adjacent effective heat transfer relationship with respect to plastic solids in the extended plasticizing passage therealong to effectively transfer a substantially greater amount of heat to the plastic material in the plasticizing passage adjacent the inflow end thereof than adjacent the outflow end thereof whereby to minimize operating pressures within the plasticizing passage.

3. A pre-plasticizing unit adaptable for use with a plastic molding machine including a reservoir adapted to hold a supply of particulate plastic solids, feed passage arranged to receive plastic solids from said reservoir, an extended plasticizing passage substantially rectangular in cross sectional area having an outflow end and an inflow end cooperable with the feed passage to receive plastic solids therefrom, said passage extending spirally about the full length of the injection chamber of the molding machine and having a progressively decreasing cross sectional area from the inflow end to the outflow end thereof, a ram reciprocally mounted in said feed passage for moving plastic solids along said extended plasticizing passage, and heating means intermediate the plasticizing passage and the injection chamber in closely adjacent effective heat transfer relationship with respect to the plastic solids in the extended plasticizing passage therealong whereby to effectively plasticize plastic solids therein as they are moved by the said means from the inflow end of the extended plasticizing passage to the outflow end thereof.

4. A pre-plasticizing unit adaptable for use with a plastic molding machine including a reservoir adapted to hold a supply of particulate plastic solids, feed passage means cooperative with the reservoir to receive plastic solids from said reservoir, an extended plasticizing passage substantially rectangular in cross sectional area having an outflow end and an inflow end cooperable with the feed passage to receive plastic solids therefrom, said passage being coextensive with and extending spirally about the longitudinal axis of the injection chamber of a molding machine and having a progressively decreasing cross sectional area from the inflow end to the outflow end thereof, feed means responsive to pressure within the plasticizing passage for moving plastic solids along said extended plasticizing passage and depositing same into the injection chamber of the machine, and heating means intermediate said injection chamber and said plasticizing passage in closely adjacent effective heat transfer relationship with respect to the plastic solids in the plasticizing passage therealong whereby to effectively plasticize plastic solids therein as they are moved by the said means from the inflow end of the extended plasticizing passage to the outflow end thereof.

5. A pre-plasticizing unit adaptable for use with a plastic molding machine having an injection chamber with an injection ram movable therein and having a discharge passage adapted to be put into connection with a mold, said pre-plasticizing unit including a reservoir adapted to hold a supply of particulate plastic solids, feed passage means cooperative with the reservoir to receive plastic solids from said reservoir, a spirally arranged rectangular groove formed in the outer wall surface of the injection chamber and coextensive therewith, a sleeve surrounding and secured to the outer wall surface of said chamber and with said groove defining a plasticizing passage having an inflow end and an outflow end, feed means responsive to pressure within the plasticizing passage for moving plastic solids along said plasticizing passage, discharge passage means cooperative with the outflow end of the plasticizing passage and cooperable with said injection chamber to effectively connect said plasticizing passage and said injection chamber, and heating means intermediate said injection chamber and said plasticizing passage in closely adjacent effective heat transfer relationship with respect to the plastic solids in the plasticizing passage whereby to effectively plasticize plastic solids therein as they are moved by the said feed means from the inflow end of the plasticizing passage to the outflow end thereof.

6. A pre-plasticizing unit adaptable for use with a plastic molding machine having an injection chamber with an injection ram movable therein and having a discharge passage adapted to be put into connection with a mold, said pre-plasticizing unit including a reservoir adapted to hold a supply of particulate plastic solids, feed passage means cooperative with the reservoir to receive plastic solids from said reservoir, a rectangularly shaped groove formed in the outer wall surface of the injection chamber coextensive therewith and having a progressively decreasing cross sectional area from the inflow end to the outflow end thereof, a sleeve surrounding and secured to the outer wall surface of said chamber and cooperating with said groove to define a plasticizing passage having an inflow end and an outflow end, feed means responsive to the pressure within the plasticizing passage for moving plastic solids along said plasticizing passage, discharge passage means cooperative with the outflow end of the plasticizing passage and cooperable with said injection chamber to effectively connect said plasticizing passage and said injection chamber, and axially disposed heating means intermediate the injection chamber and said plasticizing passage to effectively plasticize plastic solids therein as they are moved by the said means from the inflow end of the plasticizing passage to the outflow end thereof.

7. A pre-plasticizing unit adaptable for use with a plastic molding machine having an injection chamber with an injection ram movable therein and having a discharge passage adapted to be put into connection with a mold, said pre-plasticizing unit including a reservoir adapted to hold a supply of particulate plastic solids, feed passage means for conveying plastic solids from said reservoir, a longitudinally extending spirally arranged rectangular groove formed in the outer wall surface of the injection chamber and coextensive therewith, a sleeve surrounding and immovably secured to the outer wall surface of said chamber and with said groove defining a plasticizing passage having an inflow end and an outflow end, feed means sensitive to pressure within the plasticizing passage for moving plastic solids along said passage, discharge passage means connecting the outflow end of the plasticizing passage with the injection chamber, heating means intermediate said injection chamber and said plasticizing passage in closely adjacent effective heat transfer relationship with respect to the plastic solids moving through the plasticizing passage, and valve means for controlling the flow of plastic material from the injection chamber into the mold, said valve means being operable in timed relation with the injection ram.

8. A pre-plasticizing unit adaptable for use with a plastic molding machine including a reservoir adapted to hold a supply of particulate plastic solids, feed passage means arranged to convey plastic solids from said reservoir, an extended plasticizing passage substantially rectangular in cross sectional area having an outflow end and an inflow end cooperable with the feed passage to receive plastic solids therefrom, said passage being spirally disposed about the injection chamber of the molding machine and extending the length thereof, means disposed in said feed passage responsive to pressure in the plasticizing passage for moving plastic solids along said extended plasticizing passage and depositing same in the said injection chamber, and heating means intermediate the plasticizing passage and the injection chamber in closely adjacent heat transfer relationship with respect to plastic solids in the extended plasticizing passage therealong and arranged to transfer a substantially greater amount of heat to the plastic material in the plasticizing passage adjacent the inflow end thereof than the balance of the passage and valve means for controlling the flow of plastic material from the injection chamber into the mold, said valve means being operable in timed relation with the injection ram moving in the injection chamber.

References Cited in the file of this patent

UNITED STATES PATENTS

| 2,319,482 | Tucker | May 18, 1943 |
| 2,359,839 | Goessling | Oct. 10, 1944 |
| 2,491,343 | Valyi | Dec. 13, 1949 |
| 2,501,595 | Bohannon | Mar. 21, 1950 |
| 2,493,805 | Binzl | Jan. 10, 1950 |
| 2,566,293 | Robinson | Aug. 28, 1951 |

FOREIGN PATENTS

| 511,764 | Great Britain | Aug. 23, 1939 |
| 676,602 | Great Britain | July 30, 1952 |